Patented Nov. 29, 1938

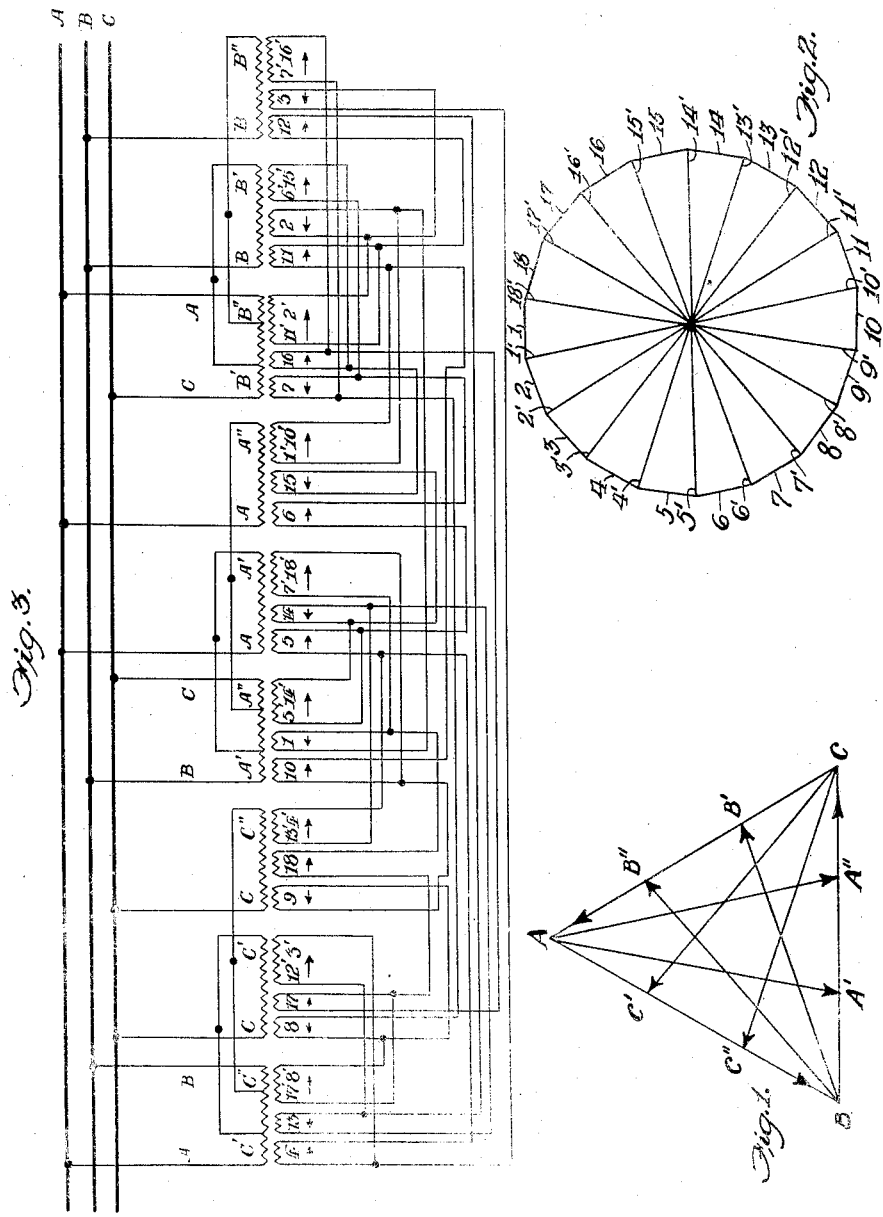

2,138,548

UNITED STATES PATENT OFFICE 2,138,548

CONNECTION SYSTEM FOR PRIMARY WINDINGS OF TRANSFORMERS FOR USE IN COMMUTATOR TYPE CONVERTERS

Sadayosi Kuroda, Ganmiti-tyo, Nagoya-si, Japan

Application December 12, 1936, Serial No. 115,645
In Japan May 23, 1936

1 Claim. (Cl. 172—238)

This invention relates to a connection system for transformers used in commutator type converters of the kind in which electric energy from a polyphase alternating current source is transformed into a greater number of phases than that of the said source and the resultant alternating voltage rectified by a commutator device.

The present invention has for its object to provide a commutator type converter adapted to secure balancing of the load so as to obtain good commutation.

The invention is characterized in that each of the windings of a delta-connected primary is tapped at one or more points in a manner dividing said winding into equal parts and each tapped point of each of said windings then connected through further windings with the junction between the two remaining delta-connected windings; in other words in a vector diagram employing an equilateral triangle for indicating the delta-connected primary winding, each side of said triangle is divided into an equal number of parts and each of said dividing points connected to the apex opposite each side.

The accompanying drawing shows vector diagrams illustrating an embodiment of the invention, in which:

Fig. 1 shows a primary connection diagram for a transformer for eighteen-phase transformation.

Fig. 2 shows a secondary connection diagram corresponding to the connection shown in Fig. 1.

Fig. 3 is a view illustrating the transformer in diagrammatic form.

In a converter employing a transformer, it is desirable that the output of the secondary of the transformer is in as many phases as possible for minimizing pulsation of direct current from the converter, and particularly it is necessary in case of the rectification of high-tension current. For this purpose, it is in general considered as most effective means to make the connection of the secondary of the transformer to comprise as many windings as possible in ring-connection and the same number of other windings in star or radial-connection, each of which is connected at one end to the first mentioned windings respectively, for securing a connection of as many phases as possible.

For facilitating the provision of such a connection of the secondary of the transformer, the invention provides an improved and effective connection of the primary of the transformer comprising three windings in delta connection and other windings connecting three junction points in the delta connection to points dividing each of the first mentioned windings into any desired parts, the dividing points being made tapping points. It is desired that the dividing points are points dividing the winding into any desired equal parts, but these points may be suitably displaced if necessary in practical construction.

The invention may be carried into effect in the following manner by way of example:

The primary of the transformer comprises three windings AB, BC and CA in delta connection as shown by ABC in Fig. 1 and six other windings CC', CC", AA', AA", BB' and BB" connecting the points C, A and B to trisection (exactly or nearly) points C' and C", A' and A" and B' and B" of the windings AB, BC and CA respectively, the said trisection points being made tapping points.

With this primary, the secondary of the transformer may comprise eighteen windings 1–18 in ring-connection and eighteen other windings 1'–18' in star or radial-connection, each of which is connected at one end to the first mentioned windings respectively, to provide an eighteen-phase connection as shown in Fig. 2.

In this way, the primary of the transformer comprises three windings in delta connection and other windings connecting the three junction points in the delta connection to $n$-section points of each of the three windings respectively, the secondary comprising $2\times\{3+3(n-1)\}$ windings in ring-connection and the same number of other windings in star or radial-connection, each of which is connected at one end to the first mentioned windings respectively.

According to the feature of the invention evident from the foregoing, the secondary connection is suited to a balanced load and as additional windings are provided in the primary, which connect the point or points dividing each winding of a delta-connected primary into equal parts with the junction between the two remaining windings, when a distortion is produced in a winding upon commutation, this distortion falls on all windings whereby a balanced load is secured resulting in good commutation.

It will be understood that the invention may be applied to in case of conversion of direct current to alternating current.

I claim:

A connection system for primary windings of transformers used in commutator type converters of the kind in which electric energy from a polyphase alternating current source is transformed into a greater number of phases than that of said source and the resultant alternating voltage rectified by a commutator comprising a set of delta-connected windings and another set of windings each connecting each junction point of said delta-connected windings to equidivisional tapped points of opposite side of said junction point, adapted to associate with a secondary winding comprising windings in a ring connection and other windings in a radial connection.

SADAYOSI KURODA.